(12) United States Patent
Champion et al.

(10) Patent No.: US 6,999,403 B2
(45) Date of Patent: Feb. 14, 2006

(54) STORAGE DEVICE HAVING A PROBE TO COOPERATE WITH A STORAGE MEDIUM TO PROVIDE A VARIABLE RESISTANCE

(75) Inventors: Corbin L Champion, Pullman, WA (US); Sarah M. Brandenberger, Boise, ID (US); Cyrille De Brebisson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 22 days.

(21) Appl. No.: 10/817,208

(22) Filed: Apr. 2, 2004

(65) Prior Publication Data

US 2005/0226117 A1    Oct. 13, 2005

(51) Int. Cl.
*G11B 9/00* (2006.01)
(52) U.S. Cl. ..................................... 369/126
(58) Field of Classification Search ................. 73/105; 369/53.1, 126; 250/306, 307
See application file for complete search history.

(56) References Cited

U.S. PATENT DOCUMENTS

| 5,345,815 | A | 9/1994 | Albrecht et al. | |
|---|---|---|---|---|
| 5,835,477 | A | 11/1998 | Binnig et al. | 369/126 |
| 5,856,967 | A | 1/1999 | Mamin et al. | |
| 6,233,206 | B1 | 5/2001 | Hamann et al. | |
| 6,370,107 | B1 | 4/2002 | Hosaka et al. | |
| 6,473,361 | B1 | 10/2002 | Chen et al. | |
| 6,762,402 | B1 * | 7/2004 | Choi et al. | 250/234 |
| 2004/0113641 | A1 * | 6/2004 | Birecki et al. | 324/754 |

OTHER PUBLICATIONS

Vettiger and Binnig, Scientific American, "The Nanodrive Project," pp. 47-51,53 (Jan. 2003).

* cited by examiner

*Primary Examiner*—Daniel S. Larkin

(57) ABSTRACT

A storage device includes an electrically conductive storage medium and a probe having a tip that is electrically conductive. The tip is electrically contacted to the storage medium and is adapted to form a dent in the storage medium. The tip is also adapted to cooperate with the storage medium to provide a variable resistance based on whether the tip is engaged in the dent.

13 Claims, 5 Drawing Sheets

STORAGE DEVICE HAVING A PROBE TO COOPERATE WITH A STORAGE MEDIUM TO PROVIDE A VARIABLE RESISTANCE

BACKGROUND

In computing systems, such as desktop computers, portable computers, personal digital assistants (PDAs), servers, and others, storage devices are used to store data and program instructions. One type of storage device is a disk-based device, such as a magnetic disk drive (e.g., a floppy disk drive or hard disk drive) and an optical disk drive (e.g., a CD or DVD drive). Disk-based storage devices have a rotating storage medium with a relatively large storage capacity. However, disk-based storage devices offer relatively slow read-write speeds when compared to operating speeds of other components of a computing system, such as microprocessors and other semiconductor devices.

Another type of storage device is a solid state memory device, such as a dynamic random access memory (DRAM), static random access memory (SRAM), flash memory, and electrically erasable and programmable read-only memory (EEPROM). Although solid state memory devices offer relatively high read-write speeds, usually on the order of nanoseconds, they have relatively limited storage capacities.

With improvements in nanotechnology (technology involving microscopic moving parts), other types of storage devices are being developed. One such storage device is based on atomic force microscopy (AFM), in which one or more microscopic scanning probes are used to read and write to a storage medium. Typically, a scanning probe has a tip that is contacted to a surface of the storage medium. Storage of data in the storage medium is based on perturbations created by the tip of the probe in the surface of the storage medium. In one implementation, a perturbation is a dent in the storage medium surface, with a dent representing a logical "1," and the lack of a dent representing a logical "0." Other types of perturbations that can be created in the surface of the storage medium include creating or altering the topographic features or composition of the storage medium, altering the crystalline phase of the medium, filling or emptying existing electronic states of the medium, creating or altering domain structures or polarization states in the medium, creating or altering chemical bonds in the medium, employing the tunneling effects to move and remove atoms or charge to or from the medium, or storing/removing charge from a particular region.

Traditionally, for a probe to read data bits from a storage medium in which dents have been formed, the probe is heated to a predetermined temperature, such as 400° C. Thermal interaction between the probe tip and a dent (or lack thereof) is detected by read circuitry to determine whether or not a selected storage cell contains a dent. The temperature of the probe changes based on whether or not the probe tip is engaged in a dent. The tip resistance, which is proportional to the temperature of the tip, is detected by read circuitry. The change in resistance of the probe tip based on a change in temperature of the probe tip is relatively small. As a result, reliable detection of data bits may not always be possible due to the presence of noise and other factors. Also, the speed at which read operations can be performed is also reduced due to weak read signals in such probe-based storage devices.

DETAILED DESCRIPTION

Figure 1:
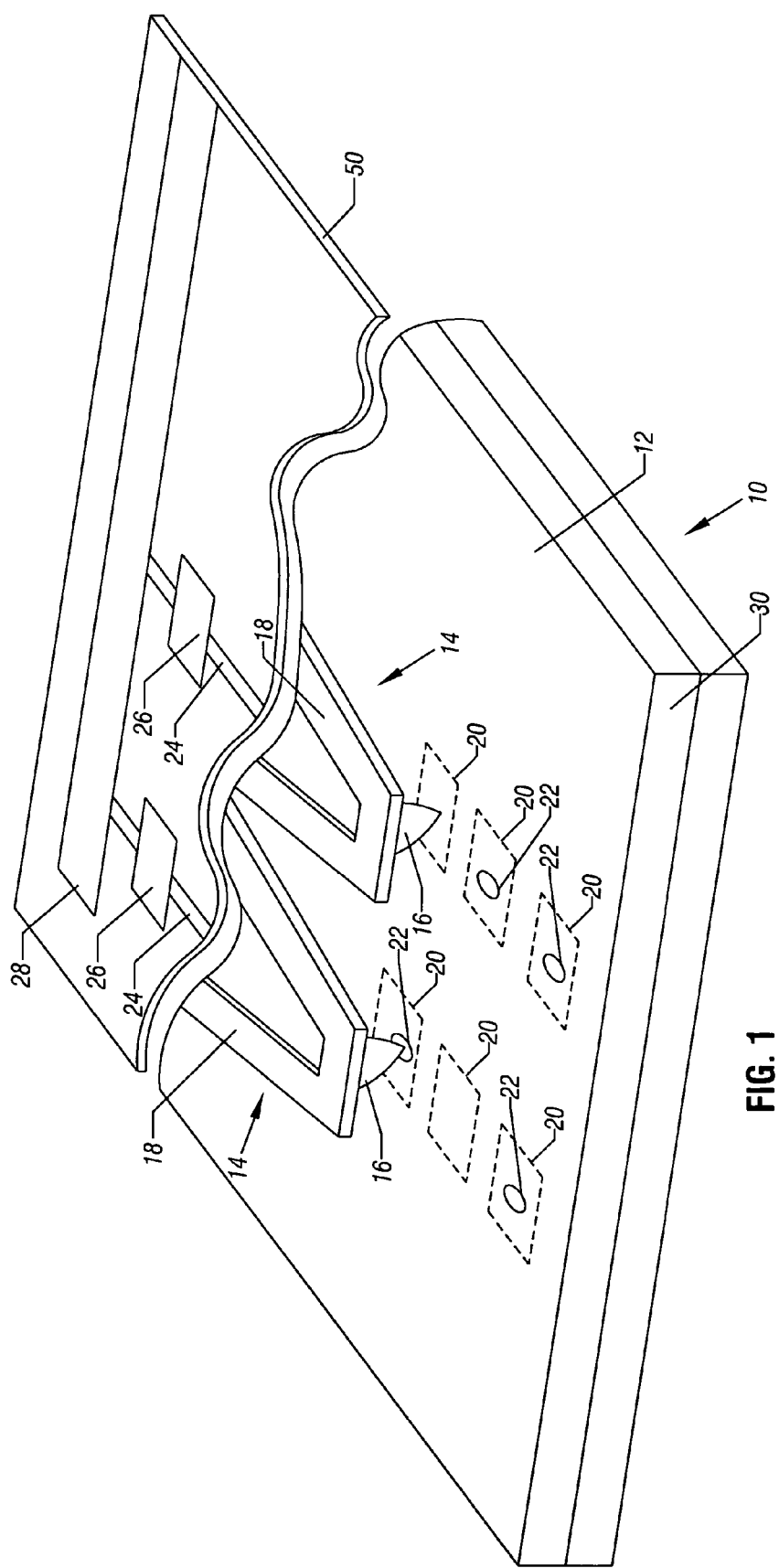
FIG. 1 illustrates a portion of a probe-based storage device that includes a probe for detecting a data state based on a detected value of a variable resistance associated with interaction of a tip of the probe with an electrically conductive portion of a storage medium, in accordance with some embodiments of the invention.

FIG. 1 shows an example probe-based storage device that includes a storage substrate 10 that provides a storage medium. As used here, the term "storage medium" refers to any medium in which storage cells are capable of being formed. As depicted in FIG. 1, the storage medium is made up of a layer 30 that is part of the storage substrate 10.

The layer 30 has a storage surface 12 on which perturbations in the storage cells 20 can be formed by tips 16 of respective probes 14. The tip 16 of each probe 14 is attached to and protrudes outwardly from a cantilever 18 of the probe 14. According to some embodiments, each probe 14 is a very small probe (on the order of micrometers, nanometers, or even smaller) that is built using nanotechnology techniques. Such probes are referred to as microscopic probes or nanotechnology probes.

The cantilever 18 and tip 16 are formed of an electrically conductive material (e.g., metal, doped silicon, polysilicon, and so forth). The layer 30 is also formed of an electrically conductive material to enable electrical communication between the probe 14 and the layer 30. A further characteristic of the layer 30 is that it is relatively soft such that the tips 16 of respective probes 14 are able to form dents 22 in the storage surface 12. Dents 22 are formed in selected storage cells 20. An example material that can be used to form the layer 30 is polymer (e.g., PMMA or polymethylmethacrylate) doped with electrically conductive elements. Other materials can be used in other embodiments.

FIG. 1 shows an array of storage cells 20 formed in the storage medium. Note that a large number of storage cells 20 can be defined in the storage medium, with six such storage cells 20 shown in FIG. 1 for purposes of illustration. In each storage cell 20, the tip 16 of a probe 14 can cause formation of a dent 22, which is basically a pit or hole that is formed into the layer 30. In the example shown in FIG. 1, four of the storage cells 20 contain dents 22 formed by tips 16 of the probes 14, while two of the storage cells 20 do not have dents 22. Absence of a dent 22 represents a first storage state, while presence of the dent 22 represents a second storage state. Thus, for example, the presence of the dent 22 represents a logical "1," while the absence of the dent represents a logical "0."

To write to the storage medium, each probe 14 is scanned across the storage surface 12, with the tip 16 heated and contacted to corresponding positions on the storage medium storage surface 12 to form corresponding dents 22. To read from the storage medium, the probes 14 are also scanned across the storage surface 12. Detection of whether a dent 22 is present or not in a storage cell is based on a detected electrical resistance formed at least in part by electrical contact between the tip 16 and the electrically conductive layer 30. During a read operation, an electrical signal is applied to the cantilever 18 and tip 16. This electrical signal encounters a variable resistance associated with a signal path through the probe tip 16 and layer 30. When the probe tip 16 is engaged inside a dent 22, a larger surface area of the tip 16 is electrically contacted to the layer 30 such that the signal path has a lower resistance. On the other hand, if the probe tip 16 is not engaged in a dent 22, then only the apex of the tip 16 is electrically contacted to the layer 30, which results in the signal path having a higher resistance.

An electrically conductive wire 24 (which can be a trace formed on a probe substrate 50) electrically connects the cantilever 18 of each probe 14 to a respective current sensor 26. The probes 14 are also formed on the probe substrate 50. As shown in FIG. 1, two current sensors 26 are connected by two respective electrically conductive wires 24 to two respective probes 14. The current sensors 26 are in turn connected to a decoder 28, which provides an output indication of data states detected by the probes 14. In an alternative embodiment, instead of having one current sensor 26 for each probe 14, multiplexing circuitry can be provided such that one current sensor can be used for multiple probes 14.

Figure 2A:
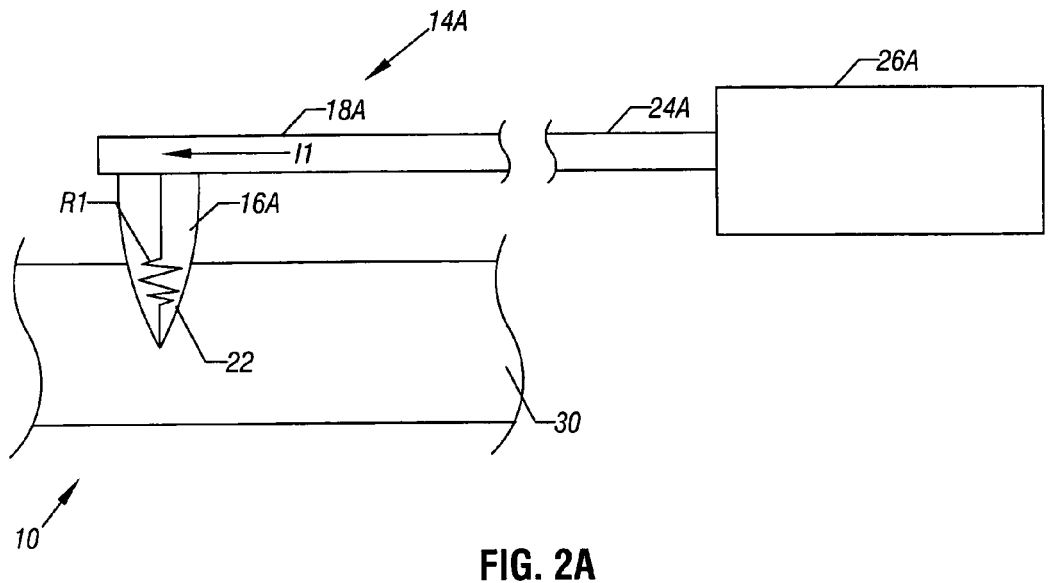
FIGS. 2A and 2B illustrate resistances detected by probes of the probe-based storage device depending upon whether or not the probes are engaged in a dent, in accordance with an embodiment.
Figure 2B:
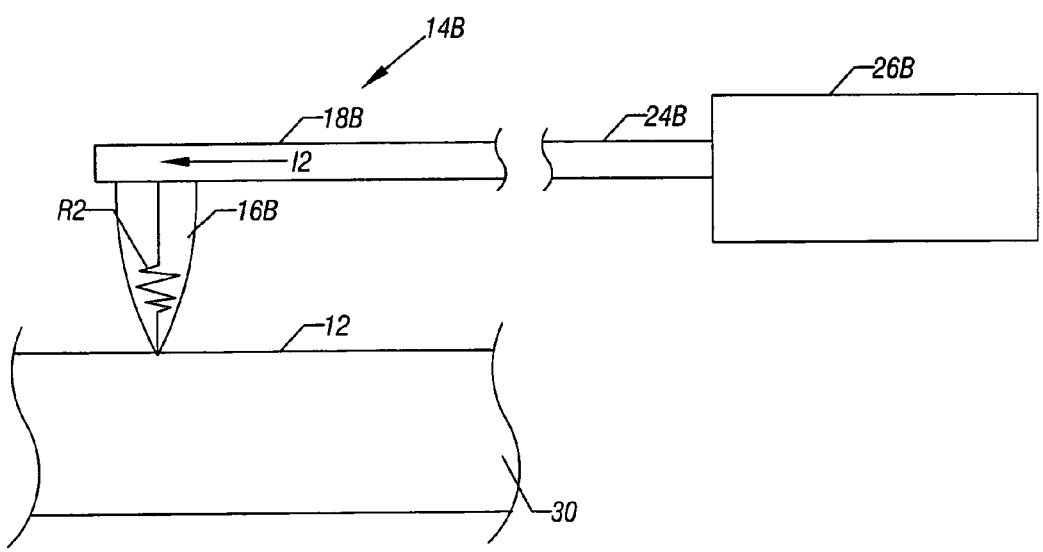

FIGS. 2A and 2B schematically illustrate how data detection is performed during a read operation. As depicted in FIG. 2A, the tip 16A of a first probe 14A is engaged in a dent 22 formed in the electrically conductive layer 30. As a result, the signal path between the cantilever 18A of the probe 14A and the layer 30 has a first resistance R1. In response to a voltage applied on the cantilever 18A, a current I1 is induced through the resistance R1 into the electrically conductive layer 30. This current I1 is sensed by the current sensor 26A through the electrical wire 24A and the cantilever 18A.

A second probe 14B as shown in FIG. 2B has a tip 16B that is engaged on the storage surface 12 (but not in a dent). As a result, the signal path between the cantilever 18B of the probe 14B and the electrically conductive layer 30 has a second resistance R2 (where R2 is greater than R1). In response to a voltage applied to the cantilever 18B, a current I2 flows through the resistance R2, which is detected by the current sensor 26B through the electrical wire 24B and cantilever 18B. Because the resistance R2 is larger than the resistance R1, the current I2 detected by the probe 14B (which is not engaged in a dent) is lower than the current I1 detected by the probe 14A (which is engaged in a dent), provided that the same voltage is applied to cantilevers 18A and 18B.

Figure 3:
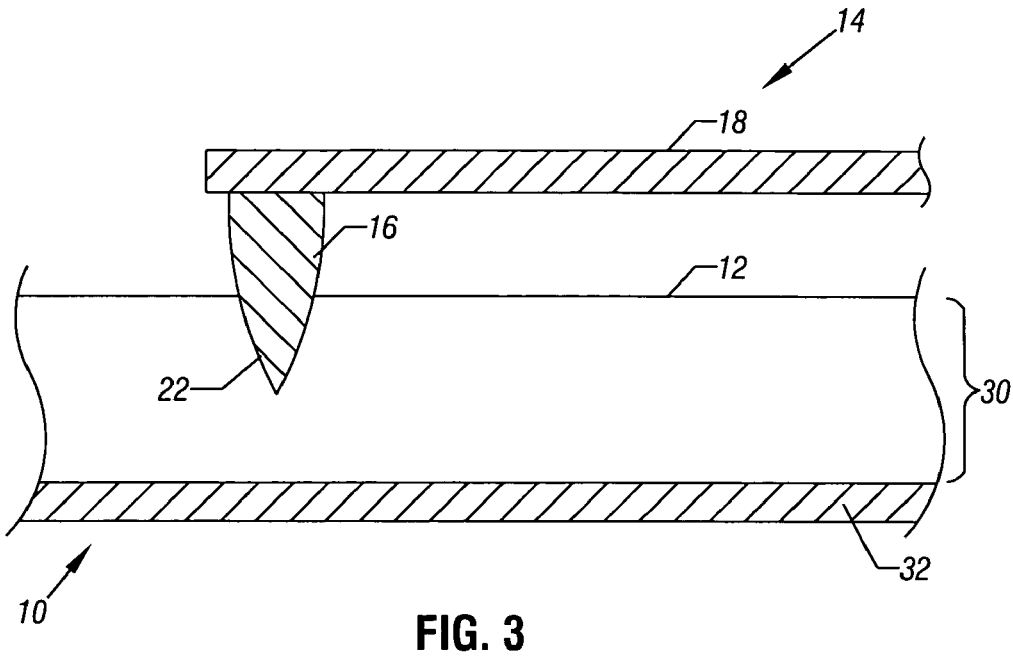
FIG. 3 is a cross-sectional view of a probe having a tip engaged in a dent formed in a storage medium in the probe-based storage device of FIG. 1.

FIG. 3 is a cross-sectional view of the probe tip 16 being engaged in a dent 22 formed in the layer 30. In the implementation depicted, an electrical conductor 32 is provided below the layer 30. The electrical conductor 32 may be formed of a metal, doped silicon, polysilicon, or other electrically conductive material. The electrical conductor 32 is able to carry an electrical signal in response to an electrical signal applied at the probe 14. In one embodiment, the electrical conductor 32 can be electrically connected to a ground or other reference potential. Multiple electrical conductors 32 can be connected to respective storage cells 20 (FIG. 1). For example, each electrical conductor 32 can be connected to a respective column of storage cells.

Figure 4:
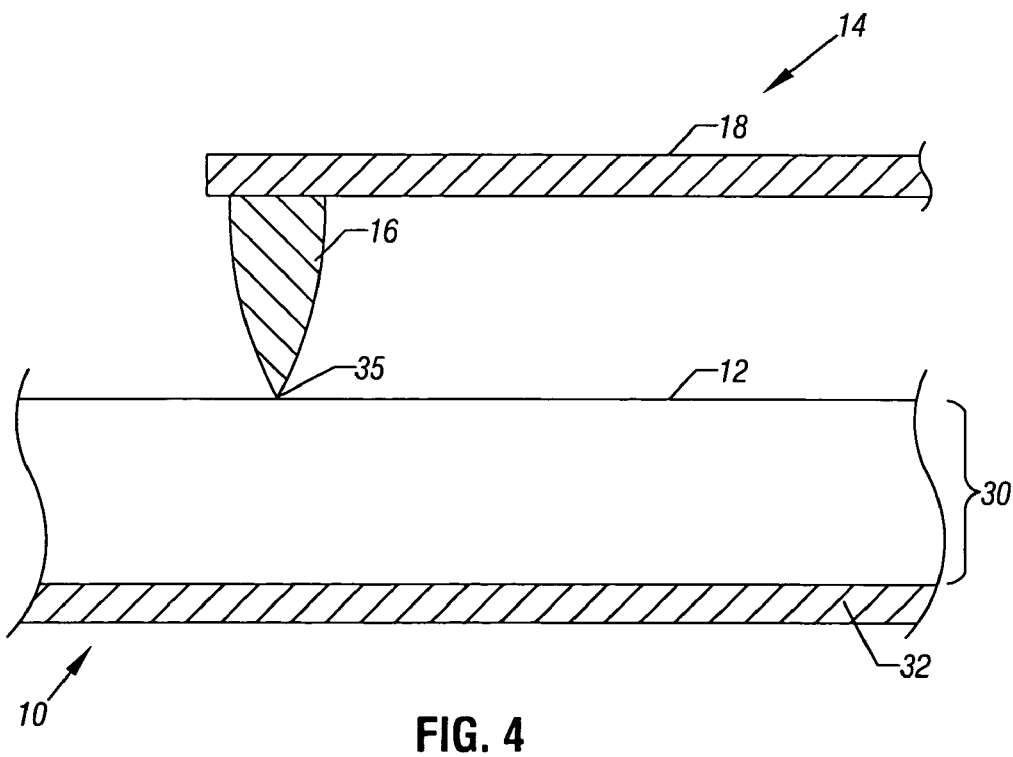
FIG. 4 is a cross-sectional view of a probe having a tip engaged on a surface of the storage medium (but not in a dent) in the probe-based storage device of FIG. 1.

FIG. 4 shows the probe tip 16 at another location on the layer 30 where the probe tip 16 is not engaged in a dent. At this position, the apex 35 of the probe tip 16 is engaged on the storage surface 12.

Figure 5:
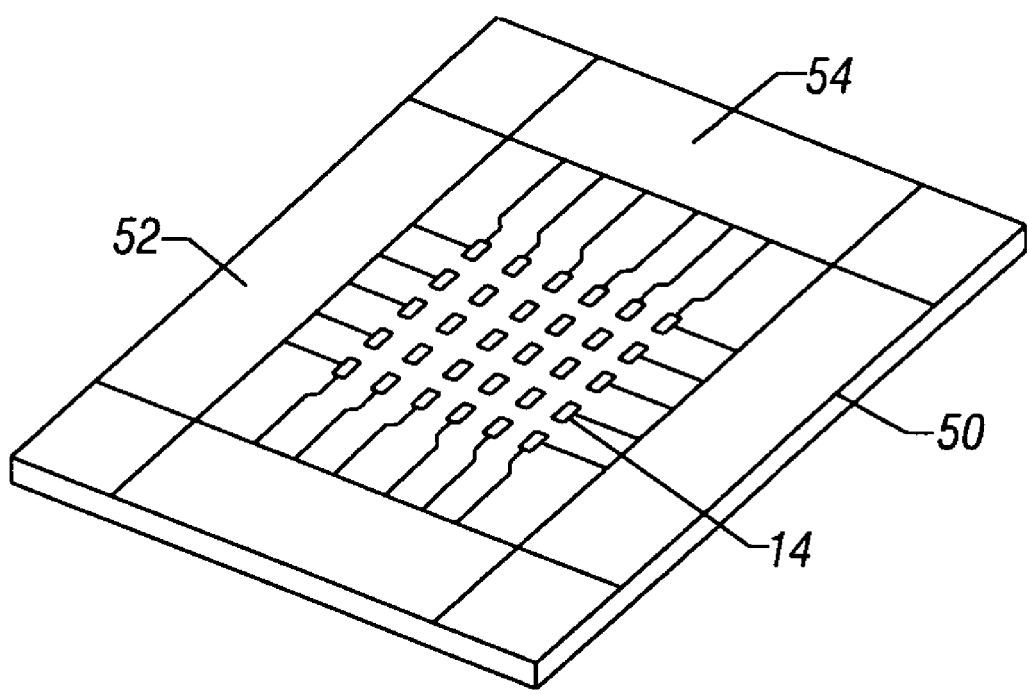
FIG. 5 is a schematic diagram of a probe substrate containing an array of probes and peripheral circuitry to interact with such probes in the probe-based storage device of FIG. 1.

FIG. 5 illustrates the probe substrate 50 that includes an array of probes 14 formed in the probe substrate 50. Peripheral circuitry 52 and 54 are provided on the peripheral sides of the probe substrate 50. For example, peripheral circuitry 52 and 54 can drive X and Y select lines to select bits of the storage array to read from or write to. A row of probes 14 may be activated by the select lines to read from or write to storage cells that the probes are in contact with. This structure enables concurrent access of multiple cells in one operation, which improves access speeds. Alternatively, one of the probes may be activated to read from or write to a storage cell. The peripheral circuitry 52 and 54 also include sensing devices (such as the current sensors 26 of FIG. 1) and decoders (such as decoder 28 in FIG. 1) to detect analog signals from the probes 14 or electrical conductors 32 (FIGS. 3 and 4) during a read operation. The sensing devices detect the level of current flow either passing through the probes 14. The sensing devices and decoders convert the analog signals to a digital representation of a logical "0" or a logical "1." Also, during a write operation, the peripheral circuitry causes heating of selected probe(s) 14 to imprint dents in selected storage cells.

Figure 6:
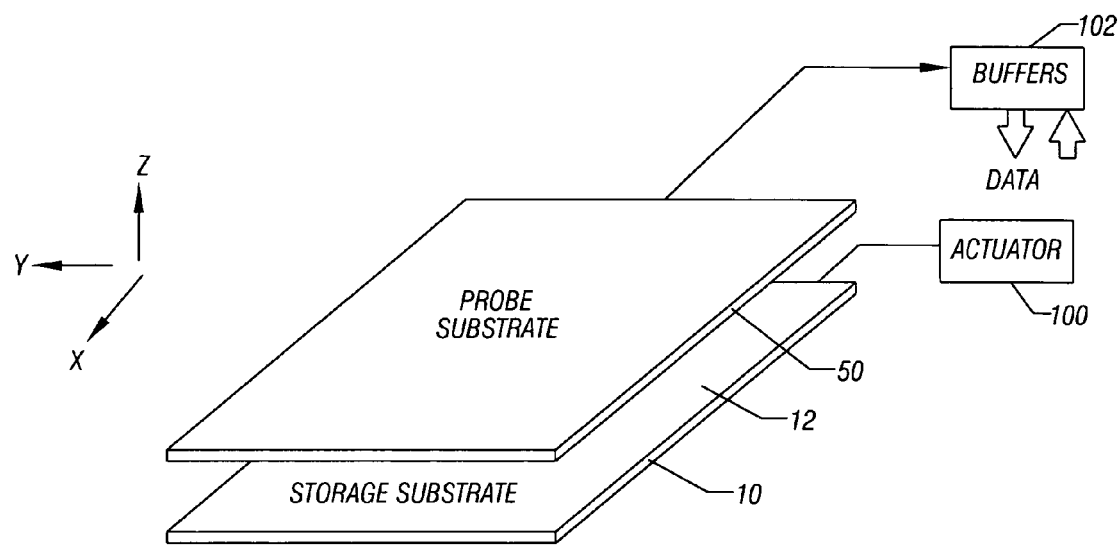
FIG. 6 illustrates the probe substrate positioned to face the storage substrate in the probe-based storage device of FIG. 1.

As shown in FIGS. 1 and 6, the probe substrate 50 is placed with the surface containing the probes 14 facing the storage surface 12 of the storage substrate 10, on which the storage cells are formed. The probe substrate 50 is positioned over the storage substrate 10 so that the probe tips 16 (FIG. 1) point downwardly to engage the storage surface 12 of the storage substrate 10. In an alternative arrangement, the storage substrate 10 is positioned over the probe substrate 50 so that the probe tips 16 point upwardly to face the storage surface 12. In other arrangements, the probe substrate 50 and the storage substrate 10 can have a lateral or diagonal relationship.

The storage substrate 10, in the example of FIG. 6, is coupled to an actuator 100 that is designed to move the storage substrate 10 in both X and Y directions such that probes 14 (FIG. 1) can be placed over desired storage cells on the storage medium. Data sensed based on signals from the probes 14 is provided to buffers 102, which store output data for retrieval by an external device. The buffers 102 may also store write data to be written to storage cells 20 (FIG. 1).

Alternatively, the actuator 100 is operatively coupled to move the probe substrate 50, or to move both the probe substrate 50 and the storage substrate 10. The actuator 100 is also able to move the probe substrate 50 and/or the storage substrate 10 in the Z direction, which is generally perpendicular to the X and Y directions.

Figure 7:
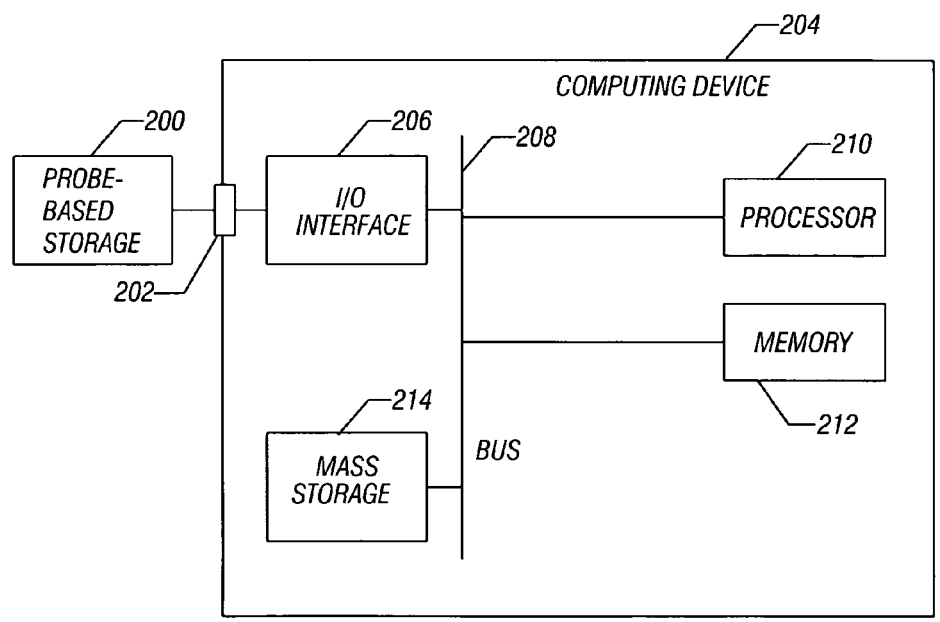
FIG. 7 is a block diagram of a system that includes a computing device having a port to connect to a probe-based storage device incorporating an embodiment of the invention.

The probe-based storage device can be packaged for use in a computing system. For example, as shown in FIG. 7, a probe-based storage device 200 that incorporates an embodiment of the invention is attached or connected to an I/O (input/output) port 202 of a computing device 204. The I/O port 202 can be a USB port, a parallel port, or any other type of I/O port. Inside the computing device 204, the I/O port 202 is connected to an I/O interface 206, which in turn is coupled to a bus 208. The bus 208 is coupled to a processor 210 and memory 212, as well as to mass storage 214. Other components may be included in the computing device 204. The arrangement of the computing device 204 is provided as an example, and is not intended to limit the scope of the invention. In alternative embodiments, instead of being coupled to an I/O port of the computing system, the probe-based storage device can be mounted (directly or through a socket) onto the main circuit board of the computing system.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A storage device comprising:
   a probe having a tip, the tip being electrically conductive;
   a storage medium, the storage medium being electrically conductive and electrically contacted to the tip, wherein the tip is adapted to form a dent in the storage medium,
   wherein the tip is adapted to cooperate with the storage medium to provide a variable resistance based on whether the tip is engaged in the dent,
   wherein the variable resistance has a first resistance value in response to the tip being engaged in the dent, and wherein the variable resistance has a second resistance value in response to the tip being engaged on a surface of the storage medium but not in the dent, the first resistance value being less than the second resistance value;
   a sensing device to detect current flow through a signal path associated with the variable resistance between the probe and the storage medium; and
   circuitry to indicate a first data state in response to detecting a first current value corresponding to the first resistance value, and to indicate a second data state in response to detecting a second current value corresponding to the second resistance value.

2. The storage device of claim 1, wherein a first surface area of the tip is electrically contacted to the storage medium in response to the tip not being engaged in a dent, and
   wherein a second, larger surface area of the tip is electrically contacted to the storage medium in response to the tip being engaged in a dent.

3. The storage device of claim 1, further comprising additional probes each having an electrically conductive tip electrically contacted to the storage medium,
   wherein the storage medium has plural storage cells, the tips of at least some of the probes to form dents in respective storage cells,
   wherein each tip cooperates with the storage medium to provide a variable resistance based on whether the tip is engaged in a dent.

4. The storage device of claim 1, wherein the tip is heatable to form the dent.

5. A storage device comprising:
   a probe having a tip, the tip being electrically conductive;
   a storage medium, the storage medium being electrically conductive and electrically contacted to the tip, wherein the tip is adapted to form a dent in the storage medium,
   wherein the tip is adapted to cooperate with the storage medium to provide a variable resistance based on whether the tip is engaged in the dent;
   circuitry to apply a voltage to the probe, wherein the variable resistance is associated with a signal path between the probe and the storage medium; and
   an electrical conductor, the storage medium being between the electrical conductor and the probe.

6. The storage device of claim 5, wherein the electrical conductor is electrically connected to a ground potential, the storage device further comprising a sensing circuit to detect a current flow through the probe, signal path, storage medium, and electrical conductor that is dependent upon the variable resistance.

7. A system comprising:
   a processor; and
   a storage device coupled to the processor, the storage device comprising:
      a probe having an electrically conductive tip;
      a storage substrate having an electrically conductive layer electrically contacted to the tip,
      the tip adapted to form dents in the electrically conductive layer,
      the tip to interact with the electrically conductive layer to provide a signal path having a variable resistance based on whether the tip is engaged in a dent;
      at least a second probe having an electrically conductive tip, the tip of the second probe adapted to form dents in the electrically conductive layer,
      wherein the tip of the second probe is adapted to interact with the electrically conductive layer to provide a second signal path having a variable resistance based on whether the tip of the second probe is engaged in a dent; and
      sensors to detect current flows through the signal paths.

8. The system of claim 7, wherein the variable resistance has a first resistance value in response to the tip of a respective probe being engaged on the surface of the electrically conductive layer but not engaged in a dent, and wherein the variable resistance has a second, smaller resist value in response to the tip being engaged in a dent.

9. The system of claim 8, wherein a first surface area of each tip is electrically contacted to the storage medium in response to the tip being engaged on a surface of the electrically conductive layer but not being engaged in a dent, and
   wherein a second surface area of each tip is electrically contacted to the storage medium in response to the tip being engaged in a dent,
   the second surface area being larger than the first surface area.

10. The system of claim 7, wherein the probe comprises a nanotechnology probe.

11. The system of claim 7, wherein each sensor is adapted to detect a first current in response to a corresponding signal path having a first resistance, and to detect a second current in response to a corresponding signal path having a second resistance.

12. A method of storing data in a storage device, comprising:
   writing to storage cells of a storage medium by forming dents in selected ones of the storage cells with a probe, wherein the storage medium is formed at least in part by an electrically conductive material;
   electrically contacting an electrically conductive tip of the probe to the storage medium;

during a read, detecting a resistance value of a signal path having variable resistance based on whether the electrically conductive tip of the probe is engaged in a dent in the storage medium, wherein detecting the resistance value of the signal path comprises:

detecting a first resistance value in response to the electrically conductive tip of the probe being engaged in a dent; and detecting a second, larger resistance value in response to the electrically conductive tip of the probe being engaged on a surface of the storage medium but not in a dent;

indicating a first storage state in response to detecting the first resistance value; and indicating a second storage state in response to detecting the second resistance value.

13. The method of claim 12, further comprising moving the storage medium with respect to the probe during each of the write and read operations.

\* \* \* \* \*